(12) United States Patent
Bellido et al.

(10) Patent No.: US 11,252,968 B2
(45) Date of Patent: Feb. 22, 2022

(54) METHOD OF PRODUCING A BAKED PRODUCT WITH ALPHA-AMYLASE, LIPASE AND PHOSPHOLIPASE

(71) Applicant: Novozymes A/S, Bagsvaerd (DK)

(72) Inventors: Guillermo Bellido, Hegenheim (FR); Gianluca Gazzola, Allschwil (CH); Irina Matveeva, Moscow (RU)

(73) Assignee: NOVOZYMES A/S, Bagsvaerd (DK)

( * ) Notice: Subject to any disclaimer, the term of this patent is extended or adjusted under 35 U.S.C. 154(b) by 0 days.

(21) Appl. No.: 14/781,164

(22) PCT Filed: Apr. 2, 2014

(86) PCT No.: PCT/EP2014/056581
§ 371 (c)(1),
(2) Date: Sep. 29, 2015

(87) PCT Pub. No.: WO2014/161876
PCT Pub. Date: Oct. 9, 2014

(65) Prior Publication Data
US 2016/0135472 A1    May 19, 2016

(30) Foreign Application Priority Data

Apr. 5, 2013   (EP) .................................... 13162411
Jan. 13, 2014   (EP) .................................... 14150897

(51) Int. Cl.
*A21D 8/04* (2006.01)
*A21D 10/00* (2006.01)

(52) U.S. Cl.
CPC ........... *A21D 8/042* (2013.01); *A21D 10/005* (2013.01)

(58) Field of Classification Search
CPC ......... A21D 8/042; A21D 10/005; A21D 8/06
USPC ...................................................... 426/18
See application file for complete search history.

(56) References Cited

U.S. PATENT DOCUMENTS

| | | |
|---|---|---|
| 2003/0194467 A1 | 10/2003 | Olsen et al. |
| 2004/0028773 A1 | 2/2004 | Sturkenboom |
| 2007/0207247 A1* | 9/2007 | Budolfsen ................. C12N 9/16 426/549 |
| 2008/0009049 A1* | 1/2008 | Viksoe-Nielsen ......... C12P 7/06 435/162 |
| 2009/0304860 A1* | 12/2009 | Burkardt ................. A21D 8/042 426/18 |
| 2011/0311678 A1* | 12/2011 | Forman .............. A21D 13/0074 426/20 |
| 2012/0164272 A1* | 6/2012 | Van Benschop ....... A21D 8/042 426/20 |

FOREIGN PATENT DOCUMENTS

| | | | |
|---|---|---|---|
| EP | 0869167 | B1 | 10/2002 |
| EP | 1301080 | B1 | 9/2011 |
| EP | 2486799 | A1 | 8/2012 |
| EP | 2579727 | B1 | 8/2018 |
| WO | 199104669 | A1 | 4/1991 |
| WO | 99/53769 | A1 | 10/1999 |
| WO | 200059307 | A1 | 10/2000 |
| WO | WO2004081171 | * | 9/2004 |
| WO | 2005001064 | A2 | 1/2005 |
| WO | 2005066338 | A1 | 7/2005 |
| WO | 2006/066579 | A1 | 6/2006 |
| WO | 2006/069290 | A2 | 6/2006 |
| WO | 2007/144424 | A2 | 12/2007 |
| WO | 2010/124206 | A1 | 10/2010 |
| WO | 2011039324 | A1 | 4/2011 |
| WO | WO2011039324 | * | 4/2011 ............... A21D 8/04 |
| WO | 2011154529 | A1 | 12/2011 |
| WO | 2013/006756 | A2 | 1/2013 |
| WO | 2013/135822 | A1 | 9/2013 |
| WO | 2014028434 | A2 | 2/2014 |

OTHER PUBLICATIONS

He et al, 2013, Genbank accession No. AGJ52081.1.
Anonymous, 2008, Enzyme Preparation Section 94-103 and 108.
Anonymous, Definition of Resilience in Lexico Dictionary (2020).
Anonymous, Definition of Resilience in Merriam-Webster Dictionary (2020).
Anonymous, Extract from BAKERpedia, Emulsifiers (2021).
Anonymous, Sequence comparison of SEQ ID No. 1 and 3 of EP 2981170 with SEQ ID No. 7 of WO 2013/006756 and SEQ ID No. 7 of WO 2007/144424.
Anonymous, Sequence comparison of SEQ ID No. 1 and 3 of EP 2981170 with the sequence of JA126 (SEQ ID No. 3) of WO 2010/124206.
Anonymous, Sequence comparison of SEQ ID No. 1 and 3 of EP 2981170 with the sequence SEQ ID No. 1 of WO 2011/154529.
EP2579727 Sequence Listing (dated Dec. 8, 2020).
Lundkvist et al, 2021, Declaration of Henrik Lundkvist submitted in opposition proceedings of EP 2981170 (2021).
Novozymes, Product Sheet for Fungamyl(R) Super MA (2012).

\* cited by examiner

*Primary Examiner* — Hamid R Badr

(74) *Attorney, Agent, or Firm* — Elias Lambiris

(57) ABSTRACT

The present invention provides a method of producing a baked product having reduced crumb elasticity, said method comprising adding a raw starch degrading alpha-amylase, a lipase and a phospholipase to dough ingredients comprising flour, water, and yeast and mixing to prepare a dough; leavening the dough; and baking the dough to obtain the baked product.

17 Claims, No Drawings
Specification includes a Sequence Listing.

SEQUENCE LISTING

<160> NUMBER OF SEQ ID NOS: 3

<210> SEQ ID NO 1
<211> LENGTH: 583
<212> TYPE: PRT
<213> ORGANISM: Artificial sequence
<220> FEATURE:
<223> OTHER INFORMATION: Synthetic construct

<400> SEQUENCE: 1

```
Ala Thr Ser Asp Asp Trp Lys Gly Lys Ala Ile Tyr Gln Leu Leu Thr
  1               5                  10                  15

Asp Arg Phe Gly Arg Ala Asp Asp Ser Thr Ser Asn Cys Ser Asn Leu
             20                  25                  30

Ser Asn Tyr Cys Gly Gly Thr Tyr Glu Gly Ile Thr Lys His Leu Asp
         35                  40                  45

Tyr Ile Ser Gly Met Gly Phe Asp Ala Ile Trp Ile Ser Pro Ile Pro
     50                  55                  60

Lys Asn Ser Asp Gly Gly Tyr His Gly Tyr Trp Ala Thr Asp Phe Tyr
 65                  70                  75                  80

Gln Leu Asn Ser Asn Phe Gly Asp Glu Ser Gln Leu Lys Ala Leu Ile
                 85                  90                  95

Gln Ala Ala His Glu Arg Asp Met Tyr Val Met Leu Asp Val Val Ala
            100                 105                 110

Asn His Ala Gly Pro Thr Ser Asn Gly Tyr Ser Gly Tyr Thr Phe Gly
        115                 120                 125

Asp Ala Ser Leu Tyr His Pro Lys Cys Thr Ile Asp Tyr Asn Asp Gln
    130                 135                 140

Thr Ser Ile Glu Gln Cys Trp Val Ala Asp Glu Leu Pro Asp Ile Asp
145                 150                 155                 160

Thr Glu Asn Ser Asp Asn Val Ala Ile Leu Asn Asp Ile Val Ser Gly
                165                 170                 175

Trp Val Gly Asn Tyr Ser Phe Asp Gly Ile Arg Ile Asp Thr Val Lys
            180                 185                 190

His Ile Arg Lys Asp Phe Trp Thr Gly Tyr Ala Glu Ala Ala Gly Val
        195                 200                 205

Phe Ala Thr Gly Glu Val Phe Asn Gly Asp Pro Ala Tyr Val Gly Pro
    210                 215                 220

Tyr Gln Lys Tyr Leu Pro Ser Leu Ile Asn Tyr Pro Met Tyr Tyr Ala
225                 230                 235                 240

Leu Asn Asp Val Phe Val Ser Lys Ser Lys Gly Phe Ser Arg Ile Ser
                245                 250                 255

Glu Met Leu Gly Ser Asn Arg Asn Ala Phe Glu Asp Thr Ser Val Leu
            260                 265                 270

Thr Thr Phe Val Asp Asn His Asp Asn Pro Arg Phe Leu Asn Ser Gln
        275                 280                 285

Ser Asp Lys Ala Leu Phe Lys Asn Ala Leu Thr Tyr Val Leu Leu Gly
    290                 295                 300

Glu Gly Ile Pro Ile Val Tyr Tyr Gly Ser Glu Gln Gly Phe Ser Gly
305                 310                 315                 320

Gly Ala Asp Pro Ala Asn Arg Glu Val Leu Trp Thr Thr Asn Tyr Asp
                325                 330                 335

Thr Ser Ser Asp Leu Tyr Gln Phe Ile Lys Thr Val Asn Ser Val Arg
            340                 345                 350

Met Lys Ser Asn Lys Ala Val Tyr Met Asp Ile Tyr Val Gly Asp Asn
```

```
                355                 360                 365
Ala Tyr Ala Phe Lys His Gly Asp Ala Leu Val Val Leu Asn Asn Tyr
        370                 375                 380

Gly Ser Gly Ser Thr Asn Gln Val Ser Phe Val Ser Gly Lys Phe
385                 390                 395                 400

Asp Ser Gly Ala Ser Leu Met Asp Ile Val Ser Asn Ile Thr Thr Thr
                405                 410                 415

Val Ser Ser Asp Gly Thr Val Thr Phe Asn Leu Lys Asp Gly Leu Pro
            420                 425                 430

Ala Ile Phe Thr Ser Ala Thr Gly Gly Thr Thr Thr Ala Thr Pro
                435                 440                 445

Thr Gly Ser Gly Ser Val Thr Ser Thr Ser Lys Thr Thr Ala Thr Ala
            450                 455                 460

Ser Lys Thr Ser Thr Ser Thr Ser Thr Ser Cys Thr Thr Pro Thr
465                 470                 475                 480

Ala Val Ala Val Thr Phe Asp Leu Thr Ala Thr Thr Thr Tyr Gly Glu
                485                 490                 495

Asn Ile Tyr Leu Val Gly Ser Ile Ser Gln Leu Gly Asp Trp Glu Thr
            500                 505                 510

Ser Asp Gly Ile Ala Leu Ser Ala Asp Lys Tyr Thr Ser Ser Asp Pro
                515                 520                 525

Leu Trp Tyr Val Thr Val Thr Leu Pro Ala Gly Glu Ser Phe Glu Tyr
            530                 535                 540

Lys Phe Ile Arg Ile Glu Ser Asp Asp Ser Val Glu Trp Glu Ser Asp
545                 550                 555                 560

Pro Asn Arg Glu Tyr Thr Val Pro Gln Ala Cys Gly Thr Ser Thr Ala
                565                 570                 575

Thr Val Thr Asp Thr Trp Arg
            580

<210> SEQ ID NO 2
<211> LENGTH: 686
<212> TYPE: PRT
<213> ORGANISM: Bacillus stearothermophilus

<400> SEQUENCE: 2

Ser Ser Ser Ala Ser Val Lys Gly Asp Val Ile Tyr Gln Ile Ile Ile
1               5                   10                  15

Asp Arg Phe Tyr Asp Gly Asp Thr Thr Asn Asn Pro Ala Lys Ser
            20                  25                  30

Tyr Gly Leu Tyr Asp Pro Thr Lys Ser Lys Trp Lys Met Tyr Trp Gly
        35                  40                  45

Gly Asp Leu Glu Gly Val Arg Gln Lys Leu Pro Tyr Leu Lys Gln Leu
    50                  55                  60

Gly Val Thr Thr Ile Trp Leu Ser Pro Val Leu Asp Asn Leu Asp Thr
65                  70                  75                  80

Leu Ala Gly Thr Asp Asn Thr Gly Tyr His Gly Tyr Trp Thr Arg Asp
                85                  90                  95

Phe Lys Gln Ile Glu Glu His Phe Gly Asn Trp Thr Thr Phe Asp Thr
            100                 105                 110

Leu Val Asn Asp Ala His Gln Asn Gly Ile Lys Val Ile Val Asp Phe
        115                 120                 125

Val Pro Asn His Ser Thr Pro Phe Lys Ala Asn Asp Ser Thr Phe Ala
    130                 135                 140
```

-continued

```
Glu Gly Gly Ala Leu Tyr Asn Asn Gly Thr Tyr Met Gly Asn Tyr Phe
145                 150                 155                 160

Asp Asp Ala Thr Lys Gly Tyr Phe His His Asn Gly Asp Ile Ser Asn
                165                 170                 175

Trp Asp Asp Arg Tyr Glu Ala Gln Trp Lys Asn Phe Thr Asp Pro Ala
            180                 185                 190

Gly Phe Ser Leu Ala Asp Leu Ser Gln Glu Asn Gly Thr Ile Ala Gln
        195                 200                 205

Tyr Leu Thr Asp Ala Ala Val Gln Leu Val Ala His Gly Ala Asp Gly
    210                 215                 220

Leu Arg Ile Asp Ala Val Lys His Phe Asn Ser Gly Phe Ser Lys Ser
225                 230                 235                 240

Leu Ala Asp Lys Leu Tyr Gln Lys Lys Asp Ile Phe Leu Val Gly Glu
                245                 250                 255

Trp Tyr Gly Asp Asp Pro Gly Thr Ala Asn His Leu Glu Lys Val Arg
            260                 265                 270

Tyr Ala Asn Asn Ser Gly Val Asn Val Leu Asp Phe Asp Leu Asn Thr
        275                 280                 285

Val Ile Arg Asn Val Phe Gly Thr Phe Thr Gln Thr Met Tyr Asp Leu
    290                 295                 300

Asn Asn Met Val Asn Gln Thr Gly Asn Glu Tyr Lys Tyr Lys Glu Asn
305                 310                 315                 320

Leu Ile Thr Phe Ile Asp Asn His Asp Met Ser Arg Phe Leu Ser Val
                325                 330                 335

Asn Ser Asn Lys Ala Asn Leu His Gln Ala Leu Ala Phe Ile Leu Thr
            340                 345                 350

Ser Arg Gly Thr Pro Ser Ile Tyr Tyr Gly Thr Glu Gln Tyr Met Ala
        355                 360                 365

Gly Gly Asn Asp Pro Tyr Asn Arg Gly Met Met Pro Ala Phe Asp Thr
    370                 375                 380

Thr Thr Thr Ala Phe Lys Glu Val Ser Thr Leu Ala Gly Leu Arg Arg
385                 390                 395                 400

Asn Asn Ala Ala Ile Gln Tyr Gly Thr Thr Gln Arg Trp Ile Asn
                405                 410                 415

Asn Asp Val Tyr Ile Tyr Glu Arg Lys Phe Phe Asn Asp Val Val Leu
            420                 425                 430

Val Ala Ile Asn Arg Asn Thr Gln Ser Ser Tyr Ser Ile Ser Gly Leu
        435                 440                 445

Gln Thr Ala Leu Pro Asn Gly Ser Tyr Ala Asp Tyr Leu Ser Gly Leu
450                 455                 460

Leu Gly Gly Asn Gly Ile Ser Val Ser Asn Gly Ser Val Ala Ser Phe
465                 470                 475                 480

Thr Leu Ala Pro Gly Ala Val Ser Val Trp Gln Tyr Ser Thr Ser Ala
                485                 490                 495

Ser Ala Pro Gln Ile Gly Ser Val Ala Pro Asn Met Gly Ile Pro Gly
            500                 505                 510

Asn Val Val Thr Ile Asp Gly Lys Gly Phe Gly Thr Thr Gln Gly Thr
        515                 520                 525

Val Thr Phe Gly Gly Val Thr Ala Thr Val Lys Ser Trp Thr Ser Asn
    530                 535                 540

Arg Ile Glu Val Tyr Val Pro Asn Met Ala Ala Gly Leu Thr Asp Val
545                 550                 555                 560

Lys Val Thr Ala Gly Gly Val Ser Ser Asn Leu Tyr Ser Tyr Asn Ile
```

```
                     565                 570                 575

Leu Ser Gly Thr Gln Thr Ser Val Val Phe Thr Val Lys Ser Ala Pro
            580                 585                 590

Pro Thr Asn Leu Gly Asp Lys Ile Tyr Leu Thr Gly Asn Ile Pro Glu
            595                 600                 605

Leu Gly Asn Trp Ser Thr Asp Thr Ser Gly Ala Val Asn Asn Ala Gln
            610                 615                 620

Gly Pro Leu Leu Ala Pro Asn Tyr Pro Asp Trp Phe Tyr Val Phe Ser
625                 630                 635                 640

Val Pro Ala Gly Lys Thr Ile Gln Phe Lys Phe Ile Lys Arg Ala
                    645                 650                 655

Asp Gly Thr Ile Gln Trp Glu Asn Gly Ser Asn His Val Ala Thr Thr
                    660                 665                 670

Pro Thr Gly Ala Thr Gly Asn Ile Thr Val Thr Trp Gln Asn
            675                 680                 685

<210> SEQ ID NO 3
<211> LENGTH: 583
<212> TYPE: PRT
<213> ORGANISM: Artificial sequence
<220> FEATURE:
<223> OTHER INFORMATION: Synthetic construct

<400> SEQUENCE: 3

Ala Thr Ser Asp Asp Trp Lys Gly Lys Ala Ile Tyr Gln Leu Leu Thr
1               5                   10                  15

Asp Arg Phe Gly Arg Ala Asp Asp Ser Thr Ser Asn Cys Ser Asn Leu
            20                  25                  30

Ser Asn Tyr Cys Gly Gly Thr Tyr Glu Gly Ile Thr Lys His Leu Asp
        35                  40                  45

Tyr Ile Ser Gly Met Gly Phe Asp Ala Ile Trp Ile Ser Pro Ile Pro
    50                  55                  60

Lys Asn Ser Asp Gly Gly Tyr His Gly Tyr Trp Ala Thr Asp Phe Tyr
65                  70                  75                  80

Gln Leu Asn Ser Asn Phe Gly Asp Glu Ser Gln Leu Lys Ala Leu Ile
                85                  90                  95

Gln Ala Ala His Glu Arg Asp Met Tyr Val Met Leu Asp Val Val Ala
            100                 105                 110

Asn His Ala Gly Pro Thr Ser Asn Gly Tyr Ser Gly Tyr Thr Phe Asp
        115                 120                 125

Asp Ala Ser Leu Tyr His Pro Lys Cys Thr Ile Asp Tyr Asn Asn Gln
    130                 135                 140

Thr Ser Ile Glu Gln Cys Trp Val Ala Asp Glu Leu Pro Asp Ile Asp
145                 150                 155                 160

Thr Glu Asn Ser Asp Asn Val Ala Ile Leu Asn Asp Ile Val Ser Gly
                165                 170                 175

Trp Val Gly Asn Tyr Ser Phe Asp Gly Ile Arg Ile Asp Thr Val Lys
            180                 185                 190

His Ile Arg Lys Asp Phe Trp Thr Gly Tyr Ala Glu Ala Ala Gly Val
        195                 200                 205

Phe Ala Thr Gly Glu Val Phe Asn Gly Asp Pro Ala Tyr Val Gly Pro
    210                 215                 220

Tyr Gln Lys Tyr Leu Pro Ser Leu Ile Asn Tyr Pro Met Tyr Tyr Ala
225                 230                 235                 240

Leu Asn Asp Val Phe Val Ser Lys Ser Lys Gly Phe Ser Arg Ile Ser
```

```
                245                 250                 255
Glu Met Leu Gly Ser Asn Arg Asn Ala Phe Glu Asp Thr Ser Val Leu
            260                 265                 270

Thr Thr Phe Val Asp Asn His Asp Asn Pro Arg Phe Leu Asn Ser Gln
            275                 280                 285

Ser Asp Lys Ala Leu Phe Lys Asn Ala Leu Thr Tyr Val Leu Leu Gly
    290                 295                 300

Glu Gly Ile Pro Ile Val Tyr Tyr Gly Ser Glu Gln Gly Phe Ser Gly
305                 310                 315                 320

Gly Ala Asp Pro Ala Asn Arg Glu Val Leu Trp Thr Thr Asn Tyr Asp
                325                 330                 335

Thr Ser Ser Asp Leu Tyr Gln Phe Ile Lys Thr Val Asn Ser Val Arg
            340                 345                 350

Met Lys Ser Asn Lys Ala Val Tyr Met Asp Ile Tyr Val Gly Asp Asn
            355                 360                 365

Ala Tyr Ala Phe Lys His Gly Asp Ala Leu Val Val Leu Asn Asn Tyr
    370                 375                 380

Gly Ser Gly Ser Thr Asn Gln Val Ser Phe Ser Val Ser Gly Lys Phe
385                 390                 395                 400

Asp Ser Gly Ala Ser Leu Met Asp Ile Val Ser Asn Ile Thr Thr Thr
                405                 410                 415

Val Ser Ser Asp Gly Thr Val Thr Phe Asn Leu Lys Asp Gly Leu Pro
            420                 425                 430

Ala Ile Phe Thr Ser Ala Thr Gly Gly Thr Thr Thr Ala Thr Pro
            435                 440                 445

Thr Gly Ser Gly Ser Val Thr Ser Thr Ser Lys Thr Thr Ala Thr Ala
    450                 455                 460

Ser Lys Thr Ser Thr Ser Thr Ser Ser Cys Thr Thr Pro Thr
465                 470                 475                 480

Ala Val Ala Val Thr Phe Asp Leu Thr Ala Thr Thr Tyr Gly Glu
                485                 490                 495

Asn Ile Tyr Leu Val Gly Ser Ile Ser Gln Leu Gly Asp Trp Glu Thr
            500                 505                 510

Ser Asp Gly Ile Ala Leu Ser Ala Asp Lys Tyr Thr Ser Ser Asp Pro
    515                 520                 525

Leu Trp Tyr Val Thr Val Thr Leu Pro Ala Gly Glu Ser Phe Glu Tyr
    530                 535                 540

Lys Phe Ile Arg Ile Glu Ser Asp Asp Ser Val Glu Trp Glu Ser Asp
545                 550                 555                 560

Pro Asn Arg Glu Tyr Thr Val Pro Gln Ala Cys Gly Thr Ser Thr Ala
                565                 570                 575

Thr Val Thr Asp Thr Trp Arg
            580
```

METHOD OF PRODUCING A BAKED PRODUCT WITH ALPHA-AMYLASE, LIPASE AND PHOSPHOLIPASE

CROSS-REFERENCE TO RELATED APPLICATIONS

This application is a 35 U.S.C. 371 national application of PCT/EP2014/056581 filed Apr. 2, 2014 which claims priority or the benefit under 35 U.S.C. 119 of European application nos. EP 13162411.6 and EP 14150897.8 filed Apr. 5, 2013 and Jan. 14, 2014, respectively, the contents of which are fully incorporated herein by reference.

FIELD OF THE INVENTION

The present invention relates to a method for the production of baked products containing no or only small amounts of artificial emulsifiers. The present invention also relates to the use of the combination of a raw starch degrading alpha-amylase, a lipase and a phospholipase for the production of dough and/or baked products.

BACKGROUND OF THE INVENTION

Anti-staling enzymes have been successfully used in the baking industry for over 20 years (WO 1991/04669). Addition of a recommended dosage of an anti-staling enzyme slows the rate at which bread crumb becomes firmer and less elastic. These benefits have made anti-staling enzymes an almost ubiquitous ingredient in breads made by industrial bakeries today.

While the perception of what constitutes bread with a fresh texture is connected to the firmness of its crumb, this is not necessarily connected to the elasticity of its crumb. That is, a fresh bread is characterized by having a crumb of low firmness (as determined by compression tests) but not or not necessarily by the degree of elasticity of its crumb. Anti-staling enzymes thus impart the crumb softening effect, and a side effect, the ability to increase or maintain crumb elasticity on storage. However, in many bread applications today, bread is formulated with the bakery emulsifier sodium stearoyl lactylate (SSL), or calcium stearoyl lactylate (CSL), or distilled monoglycerides (DMG) which has the ability to lower bread crumb elasticity. Chemical emulsifiers in general and SSL/CSL and DMG in particular are commonly used in the industrial manufacture of bread chiefly because of their ability to improve handling and process-ability and machinability properties of bread dough but also because of their ability to improve bread appearance and bread crumb structure. The SSL/CSL and DMG emulsifiers impart a decrease in crumb elasticity and an increase in crumb melting and mouth-feel scores. Given that industrially manufactured bread commonly contain both an anti-staling amylase and a bakery emulsifier, such bread can be characterized as having crumb with low firmness and with low elasticity during its shelf life.

However, most common emulsifiers are chemical substances and are not tolerated by all people. Such emulsifiers may result in allergies or incompatibility reactions. In the field of organic bakery products emulsifiers are generally regarded as critical and are widely rejected. Another disadvantage is that the emulsifiers tend to clump if they are improperly stored, e.g. at increased temperatures.

Therefore, there is a need for methods for the production of baked products that are free or essentially free of emulsifiers, but nevertheless have the desired effects of the emulsifiers, i.e. improved eating properties, such as decreased elasticity of the crumb.

SUMMARY OF THE INVENTION

Surprisingly, it has been found that it is possible to partially or fully dispense with emulsifiers by applying a raw starch degrading alpha-amylase in dough used for baked products. The use of this amylase perfectly substitutes the effect of emulsifiers in view of decreasing the elasticity of the crumb and also provides the baked products with further positive characteristics. The use of the raw starch degrading alpha-amylase is also cheaper than the use of emulsifiers. The use of raw starch degrading alpha-amylase is suitable for application in industrial baking.

Accordingly, the present invention provides a method of producing a baked product having reduced crumb elasticity, said method comprising adding a raw starch degrading alpha-amylase, a lipase and a phospholipase to dough ingredients comprising flour, water, and yeast and mixing to prepare a dough; leavening the dough; and baking the dough to obtain the baked product.

In one embodiment the raw starch degrading alpha-amylase has an amino acid sequence having at least 70% identity to SEQ ID NO:1.

In one embodiment, an anti-staling amylase, a raw starch degrading alpha-amylase, a lipase and a phospholipase are added to the dough.

In one embodiment, the anti-staling amylase is a maltogenic alpha-amylase having at least 70% identity to SEQ ID NO:2.

In one embodiment, one or more additional enzymes selected from the group consisting of a xylanase, a galactolipase, a protease, a transglutaminase, a cellulase, a hemicellulase, an acyltransferase, a protein disulfide isomerase, a pectinase, a pectate lyase, an oxidoreductase, a peroxidase, a laccase, a glucose oxidase, a pyranose oxidase, a hexose oxidase, a lipoxygenase, an L-amino acid oxidase, a carbohydrate oxidase, a sulfurhydryl oxidase, a fungal alpha-amylase, a non-raw starch degrading alpha-amylase, and a glucoamylase, are added to the dough.

The present invention also discloses a baked product obtainable by the method of the invention; and a dough prepared by adding a raw starch degrading alpha-amylase, a lipase and a phospholipase to dough ingredients comprising flour, water, and yeast and mixing.

The present invention also discloses a baking composition comprising a raw starch degrading alpha-amylase, a lipase and a phospholipase; and a baking composition comprising a raw starch degrading alpha-amylase, a lipase, a phospholipase, and an anti-staling amylase.

In one embodiment, the baking composition is a dough composition, a flour composition, or a flour pre-mix composition. The baking composition may be a granulate or an agglomerated powder. In one embodiment, 95% (by weight) of the granulate or the agglomerated powder has a particle size between 25 and 500 μm.

The present invention also discloses the use of a baking composition for preparing a dough.

In another embodiment, the present invention provides a method of producing a baked product having reduced crumb elasticity, said method comprising adding an anti-staling amylase and a raw starch degrading alpha-amylase to dough ingredients comprising flour, water, and yeast and mixing to prepare a dough; leavening the dough; and baking the dough to obtain the baked product. In one embodiment the raw starch degrading alpha-amylase has an amino acid sequence having at least 70% identity to SEQ ID NO:1. In one embodiment, the anti-staling amylase has an amino acid sequence having at least 70% identity to SEQ ID NO:2. In one embodiment, one or more additional enzymes selected from the group consisting of a xylanase, a lipase, a phospholipase, a galactolipase, a protease, a transglutaminase, a cellulase, a hemicellulase, an acyltransferase, a protein disulfide isomerase, a pectinase, a pectate lyase, an oxidoreductase, a peroxidase, a laccase, a glucose oxidase, a pyranose oxidase, a hexose oxidase, a lipoxygenase, an L-amino acid oxidase, a carbohydrate oxidase, a sulfurhydryl oxidase, a fungal alpha-amylase, a non-raw starch degrading alpha-amylase, and a glucoamylase, are added to the dough.

DETAILED DESCRIPTION OF THE INVENTION

The invention is particularly applicable to baked products prepared from a dough which is made without addition of emulsifiers, such as mono- or diglycerides, glyceryl monostearate, distilled monoglycerides (DAG), diacetyl tartaric acid esters of mono- or diglycerides (DATEM), sodium stearoyl lactylate (SSL), calcium stearoyl lactylate (CSL), sugar esters of fatty acids, polyglycerol esters of fatty acids, lactic acid esters of monoglycerides, acetic acid esters of monoglycerides, polyoxyethylene stearates, or lysolecithin. In a preferred embodiment the invention relates to a method of producing a baked product prepared from a dough which is made without addition of SSL. The invention is also applicable to baked products prepared from a dough which is made with reduced amounts of emulsifiers, or even made essentially without emulsifiers. The term "essentially without emulsifiers" indicate an amount of emulsifiers which when used in the preparation of a baked product have no significant effect on crumb elasticity.

As used herein, "baked product" means any kind of baked product including bread types such as pan bread, toast bread, open bread, pan bread with and without lid, buns, hamburger buns, rolls, baguettes, brown bread, whole meal bread, rich bread, bran bread, flat bread, tortilla, pita, Arabic bread, Indian flat bread, and any variety thereof.

As used herein "dough" means any dough used to prepare a bread. The dough used to prepare a baked product may be made from any suitable dough ingredients, including flour sourced from grains, such as, wheat flour, corn flour, rye flour, barley flour, oat flour, rice flour, or sorghum flour, potato flour, soy flour, and combinations thereof (e.g., wheat flour combined with one of the other flour sources; rice flour combined with one of the other flour sources).

The dough of the invention is normally a leavened dough or a dough to be subjected to leavening. The dough may be leavened in various ways, such as by adding dough ingredients such as chemical leavening agents, e.g., sodium bicarbonate or by adding a leaven (fermenting dough), but it is preferred to leaven the dough by adding a suitable yeast culture, such as a culture of *Saccharomyces cerevisiae* (baker's yeast), e.g. a commercially available strain of *S. cerevisiae*.

The dough may also comprise other conventional dough ingredients, e.g.: proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulphate, calcium sulphate, diluents such silica dioxide, starch of different origins. Still other convention ingredients include hydrocolloids such as CMC, guar gum, xanthan gum, locust bean gum, etc. Modified starches may be also used.

The dough ingredients may comprise fat (triglyceride) such as granulated fat or shortening, but the invention is particularly applicable to a dough where less than 1% by weight of fat or shortening is added, and particularly to a dough which is made without addition of fat or shortening.

In a preferred embodiment, the dough ingredients comprise wheat flour; preferably 10% (w/w) or more of the total flour content is wheat flour, preferably at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or preferably at least 95% (w/w) of the flour is wheat flour.

The dough may be prepared applying any conventional mixing process, such as the continuous mix process, straight-dough process, or the sponge and dough method.

Industrial Processes

The present invention is particularly useful for preparing dough and baked products in industrialized processes in which the dough used to prepare the baked products are prepared mechanically using automated or semi-automated equipment.

The process of preparing bread generally involves the sequential steps of dough making (with an optional proofing step), sheeting or dividing, shaping or rolling, and proofing, the dough, which steps are well known in the art. If the optional proofing step is used, preferably more flour is added and alkali may be added to neutralize acid produced or to be produced during the second proofing step. In an industrial baked production process according to the present invention, one or more of these steps is/are performed using automated or semi-automated equipment.

Enzymes

The present invention is directed to methods and compositions for preparing dough used to prepare breads and methods for preparing breads by applying specific enzymes to a dough used to prepare a baked product. The enzyme combination comprises at least a raw starch degrading alpha-amylase, a lipase and a phospholipase.

Raw Starch Degrading Alpha-Amylase

As used herein, a "raw starch degrading alpha-amylase" refers to an enzyme or combination of enzymes that can directly degrade raw starch granules below the gelatinization temperature of starch. The gelatinization temperature of starch can range from 51° C. to 78° C. as the gelatinization initiation temperature can vary from about 51° C. to 68° C. A raw starch degrading alpha-amylase is an enzyme that can directly degrade raw starch granules under the following conditions: When wheat flour is used to make the dough, the raw starch degrading alpha-amylase can directly degrade raw starch when the gelatinization temperature is 52° C. to 75° C. When corn flour is used to make the dough, the raw starch degrading alpha-amylase can directly degrade raw starch when the gelatinization temperature is 62° C. to 74° C. When rye flour is used to make the dough, the raw starch degrading alpha-amylase can directly degrade raw starch when the gelatinization temperature is 55° C. to 70° C. When barley flour is used to make the dough, the raw starch degrading alpha-amylase can directly degrade raw starch when the gelatinization temperature is 53° C. to 63° C. When oat flour is used to make the dough, the raw starch degrading alpha-amylase can directly degrade raw starch when the gelatinization temperature is 55° C. to 62° C. When rice flour is used to make the dough, the raw starch degrading alpha-amylase can directly degrade raw starch when the gelatinization temperature is 65° C. to 75° C. When sorghum flour is used to make the dough, the raw starch degrading alpha-amylase can directly degrade starch when the gelatinization temperature is 70° C. to 78° C. When potato starch is used to make the dough, the raw starch degrading alpha-amylase can directly degrade starch when the gelatinization temperature is 56° C. to 69° C.

In one embodiment, the raw starch degrading alpha-amylase is defined as an enzyme that has a raw starch degrading index of at least 0.2, at least 0.3, at least, 0.4, at least 0.5, at least 0.6, at least 0.7, at least 0.8, at least 0.9, at least 1, at least 1.1, at least 1.2, at least 1.3, at least 1.4, at least 1.5, at least 1.6, at least 1.7, at least 1.8, at least 1.9, at least 2, wherein the raw degrading index is a ratio of activity to degrade raw starch to activity to degrade gelatinized starch (Ra/Ga). Preferably, the raw starch degrading alpha-amylase is defined as an enzyme that has a raw starch degrading index of higher than 1. The activity on gelatinized starch is measured by measuring the release of glucose produced by the enzyme on a 2% gelatinized (e.g., corn) starch reaction mixture. The activity is measured by the release of reducing sugars produced in 4 mol per hour per mg of pure active enzyme. The same assay can then be used to measure the activity of the enzyme on raw starch, but substituting the 2% gelatinized (e.g., corn) starch by 2% of raw (e.g., corn) starch. In both assays, the temperature is 40° C., the same pH and buffer solution is used and the incubation time is 6 hours, and is further described in the "Materials and Methods" section below.

Raw starch degrading alpha-amylases are ubiquitous and produced by plants, animals, and microorganisms, such as, fungal, bacterial and yeast raw starch degrading alpha-amylases.

The raw starch degrading alpha-amylase may preferably be an alpha-amylase comprising a starch-binding domain (SBD) and an alpha-amylase catalytic domain (CD). Examples of such alpha-amylases include the ones disclosed in WO 2005/003311, U.S. Patent Publication no. 2005/0054071 (Novozymes), and U.S. Pat. No. 7,326,548 (Novozymes). Examples also include those enzymes disclosed in Table 1 to 5 of the examples in U.S. Pat. No. 7,326,548, in U.S. Patent Publication no. 2005/0054071 (Table 3 on page 15), as well as the enzymes disclosed in WO 2004/020499 and WO 2006/06929 and the enzymes disclosed in WO 2006/066579 as SEQ ID NO:2, SEQ ID NO:3, or SEQ ID NO:4. A preferred raw starch degrading acid alpha-amylase enzyme is the hybrid alpha-amylase consisting of *Rhizomucor pusillus* alpha-amylase with *Aspergillus niger* glucoamylase linker and SBD disclosed as V039 in Table 5 in WO 2006/069290, and as SEQ ID NO:1 herein.

Also preferred is a raw starch degrading acid alpha-amylase enzyme having at least 65%, particularly at least 70%, e.g. at least 75%, more particularly at least 80%, such as at least 85%, even more particularly at least 90%, most particularly at least 95%, e.g. at least 96%, such as at least 97%, and even most particularly at least 98%, such as at least 99% identity to the alpha-amylase shown as SEQ ID NO:1 herein. Preferably the raw starch degrading alpha-amylase is an enzyme having the amino acid sequence shown in SEQ ID NO:1 herein. In another preferred embodiment, the raw starch degrading alpha-amylase is a variant having the substitutions G128D and D143N in SEQ ID NO:1 (shown as SEQ ID:3 herein).

Examples of raw starch degrading alpha-amylases include variants of the above-listed raw starch degrading alpha-amylases. Examples of variants of the above-listed raw starch degrading alpha-amylases include variants, which have one or more conservative amino acid substitutions.

The raw starch degrading alpha-amylase is added in an amount effective to reduce the crumb elasticity of the baked product. The raw starch degrading alpha-amylase, for example, may be added to the dough in an amount of 0.1 to 100 AFAU/kg flour, such as, 1 to 5 AFAU/kg flour, 0.5 to 3 AFAU/kg flour, and 0.3 to 2 AFAU/kg flour.

In one embodiment, the raw starch degrading alpha-amylase may be added to flour or dough in an amount of 0.1-10,000 ppm, for example 0.1-10 ppm, 1-10 ppm, 1-50 ppm, 1-100 ppm, 1-200 ppm, 1-300 ppm, 1-400 ppm, 1-500 ppm. The dosage of the raw starch degrading alpha-amylase should be adapted to the nature and composition of the flour or dough in question.

Phospholipases

The phospholipase activity may be phospholipase A1 (EC 3.1.1.32) activity, or phospholipase A2 (EC 3.1.1.4) activity. Most preferably the phospholipase has phospholipase A1 activity, e.g. such as the *Fusarium oxysporum* phospholipase disclosed in WO 1998/26057. Preferably the enzyme composition comprising the phospholipase activity comprises the polypeptide disclosed as SEQ ID NO: 2 of WO 1998/26057 or a polypeptide having phospholipase activity and at least 50%, at least 60%, at least 70%, at least 75%, at least 80%, at least 85%, at least 90%, at least 95% at least 96%, at least 97%, at least 98%, or even at least 99% identity to the polypeptide disclosed as SEQ ID NO: 2 of WO 1998/26057.

Suitable commercial phospholipase preparations are LIPOPAN F™ and LIPOPAN Xtra™. Both are available from Novozymes NS. Also suitable is the phospholipase composition PANAMORE™ available from DSM.

It is preferred that the dough comprises up to 500 ppm of the phospholipase; e.g., up to 400 ppm, 300 ppm, 200 ppm, 100 ppm, 80 ppm, 40 ppm, 20 ppm, or up to 10 ppm of the phospholipase.

The phospholipase may be added in the amount of 0.001-200 mg enzyme protein (EP)/kg dough, preferably 0.005-20 mg EP/kg dough, more preferably 0.01-10 mg EP/kg dough. The phospholipase may be added in the amount of 1 LEU to 10 mill LEU/kg dough, preferably 10 LEU to 1 mill LEU/kg dough, more preferably 100 LEU to 0.1 mill LEU/kg dough, and yet more preferably 1.000 LEU to 10.00 LEU/kg dough.

Lipases

The lipase may be derived from a strain of *Humicola, Rhizomucor, Candida, Aspergillus, Rhizopus,* or *Pseudomonas,* in particular from *H. lanuginosa, Rhizomucor miehei, C. antarctica, A. niger, Rhizopus delemar, Rhizopus arrhizus* or *P. cepacia.*

Suitable commercial lipase preparations are LIPOPAN™, e.g., LIPOPAN™ 50 BG available from Novozymes NS.

It is preferred that the dough comprises up to 500 ppm of the lipase; e.g., up to 400 ppm, 300 ppm, 200 ppm, 100 ppm, 80 ppm, 40 ppm, 20 ppm, or up to 10 ppm of the lipase.

The lipase may be added in the amount of 0.001-200 mg enzyme protein (EP)/kg dough, preferably 0.005-20 mg EP/kg dough, more preferably 0.01-10 mg EP/kg dough.

Anti-Staling Amylase

An anti-staling amylase for use in the invention may be any amylase that is effective in retarding the staling (crumb firming) of baked products. The amylase preferably has a temperature optimum in the presence of starch in the range of 30-90° C., preferably 50-80° C., particularly 55-75° C., e.g. 60-70° C. The temperature optimum may be measured in a 1% solution of soluble starch at pH 5.5. The anti-staling amylase may be an endo-amylase, preferably a bacterial endo-amylase, e.g., from *Bacillus*. A preferred example is a maltogenic alpha-amylase (EC 3.2.1.133), e.g. from *Bacillus*. A maltogenic alpha-amylase from *B. stearothermophilus* strain NCIB 11837 is commercially available from Novozymes NS under the tradename NOVAMYL.

Preferably, the maltogenic alpha-amylase is an enzyme having at least 65%, particularly at least 70%, e.g. at least 75%, more particularly at least 80%, such as at least 85%, even more particularly at least 90%, most particularly at least 95%, e.g. at least 96%, such as at least 97%, and even most particularly at least 98%, such as at least 99% identity to the alpha-amylase shown as SEQ ID NO:2 herein. Preferably, the maltogenic alpha-amylase is an enzyme having the amino acid sequence shown in SEQ ID NO:2 herein.

The maltogenic alpha-amylase may also be a variant of the maltogenic alpha-amylase from *B. stearothermophilus*, e.g., a variant disclosed in WO1999/043794; WO2006/032281; or WO2008/148845.

An anti-staling amylase for use in the invention may also be an amylase (glucan 1,4-alpha-maltotetrahydrolase (EC 3.2.1.60)) from *Pseudomonas saccharophilia* or variants thereof, such as any of the amylases disclosed in WO1999/050399, WO2004/111217 or WO2005/003339.

A maltogenic alpha-amylase is added in an effective amount for retarding the staling (crumb firming) of the baked product. The amount will typically be in the range of 0.01-10 mg of enzyme protein per kg of flour, e.g. 1-10 mg/kg. A maltogenic alpha-amylase is preferably added in an amount of 50-5000 MANU/kg of flour, e.g. 100-1000 MANU/kg.

Other Enzymes

One or more additional enzymes may be added to the dough. The additional enzymes may selected from the group consisting of a xylanase, a galactolipase, a protease, a transglutaminase, a cellulase, a hemicellulase, an acyltransferase, a protein disulfide isomerase, a pectinase, a pectate lyase, an oxidoreductase, a peroxidase, a laccase, a glucose oxidase, a pyranose oxidase, a hexose oxidase, a lipoxygenase, an L-amino acid oxidase, a carbohydrate oxidase, a sulfurhydryl oxidase, a maltogenic alpha-amylase, a fungal alpha-amylase, a non-raw starch degrading alpha-amylase, and a glucoamylase. The one or more additional enzymes may be of any origin, including mammalian, plant, and preferably microbial (bacterial, yeast or fungal) origin and may be obtained by techniques conventionally used in the art.

A glucoamylase may be added to the dough in an amount of 0.2-70 AGU/kg flour, preferably 1-50 AGU/kg flour, especially between 5-40 AGU/kg flour.

A fungal alpha-amylase may be added to the dough in an amount of 0.2-70 FAU/kg flour, preferably 1-50 FAU/kg flour, especially between 5-40 FAU/kg flour.

The raw starch degrading alpha-amylase, the phospholipase and the lipase as well as one or more additional enzymes may be added to flour or dough in any suitable form, such as, e.g., in the form of a liquid, in particular a stabilized liquid, or it may be added to flour or dough as a substantially dry powder or granulate. Granulates may be produced, e.g. as disclosed in U.S. Pat. No. 4,106,991 and U.S. Pat. No. 4,661,452. Liquid enzyme preparations may, for instance, be stabilized by adding a sugar or sugar alcohol or lactic acid according to established procedures. Other enzyme stabilizers are well-known in the art. The enzyme combination treatment may be added to the bread dough ingredients in any suitable manner, such as individual components (separate or sequential addition of the enzymes) or addition of the enzymes together in one step or one composition.

The degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−
Total Number of Gaps in Alignment).

Baking Composition

The present invention further relates to a baking composition comprising flour together with a raw starch degrading alpha-amylase, a lipase and a phospholipase, and optionally an anti-staling amylase.

The present invention further relates to a baking composition comprising flour together with a raw starch degrading alpha-amylase and an anti-staling amylase.

The baking composition may contain other dough-improving and/or bread-improving additives, e.g., any of the additives, including enzymes, mentioned above. The baking composition may be, e.g., a dough, a flour composition, or a flour pre-mix, or a bread improver.

Pre-Mixes

It will often be advantageous to provide the enzymes used in the treatment of the present invention in admixture with other ingredients used to improve the properties of baked products. These baking compositions are commonly known in the art as "pre-mixes," which usually comprise flour. Hence, in a further aspect, the present invention relates to a bread premix for improving the quality of dough used to prepare a baked product, which premix comprises the enzyme combination of the present invention, e.g., an anti-staling alpha-amylase and a raw starch degrading alpha-amylase; or a raw starch degrading alpha-amylase, a lipase and a phospholipase, in combination with one or more bread or dough ingredients, e.g., the ingredients described above. The pre-mix composition may be in liquid form or dry or substantially dry form.

In one embodiment, the present invention further relates to a bread pre-mix comprising the enzyme combination of the present invention and flour, such as, flour from grains, such as, wheat flour, corn flour, rye flour, barley flour, oat flour, rice flour, or sorghum flour, and combinations thereof. In another embodiment, the present invention relates to a bread pre-mix comprising the enzyme combination of the present invention and flour, such as, flour from grains, such as, wheat flour, corn flour, rye flour, barley flour, oat flour, rice flour, sorghum, soy flour, and combinations thereof, and one or more additional enzymes, as previously described.

The pre-mix may be in the form of a granulate or agglomerated powder, e.g., wherein 95% (by weight) of the granulate or agglomerated powder has a particle size between 25 and 500 µm.

Granulates and agglomerated powders may be prepared by conventional methods, e.g., by spraying the enzymes onto a carrier in a fluid-bed granulator. The carrier may consist of particulate cores having a suitable particle size.

The carrier may be soluble or insoluble, e.g. a salt (such as NaCl or sodium sulfate), a sugar (such as sucrose or lactose), a sugar alcohol (such as sorbitol), starch, rice, corn grits, or soy.

Dough and Bread Properties

In one embodiment, the bread prepared by the methods and compositions of the invention provides improved storage properties. The bread prepared by the methods and compositions of the present invention are used as anti-staling agents to improve the shelf life of the baked product. The anti-staling effect (and improved shelf life) of a baked product can be determined by a number of methods well known in the art.

Anti-staling effectiveness is primarily measured by the firmness (the same as "hardness" and the opposite of "softness") of the baked product. Firmness can be measured using a texture profile analyzer. A standard method for measuring firmness is based on force-deformation of the baked product. A force-deformation of the baked products may be performed with a cylindrical probe with a maximum deformation of 40% of the initial height of the product at a deformation speed of 1 mm/second and waiting time between consecutive deformations of 3 seconds. Force is recorded as a function of time. Firmness is defined as the maximum peak force during first compression cycle.

Gumminess and chewiness may be measured using a texture profile analyzer. Gumminess may be measured as the product of hardness times cohesiveness. Gumminess is a characteristic of semisolid food with a low degree of hardness and a high degree of cohesiveness.

Chewiness is defined as the product of gumminess times springiness (which also equals hardness times cohesiveness times springiness) and is therefore influenced by the change in any one of these parameters.

Hardness, cohesiveness, resiliency, springiness, gumminess (or stickiness), and chewiness, crumb structure may be compared to a control (i.e., a baked product prepared under identical conditions but without the enzyme treatments of the present invention). These concepts and measurements are also described in Bourne, M. C., *Food Texture and Viscosity. Concept and Measurement*, Second Edition (2002).

Other tests known in the art may be used to assess the shelf life and other organoleptic qualities of the bread prepared by the methods and compositions of the present invention. The properties of the bread may be referred to herein as organoleptic properties, which include anti-staling (bread crumb firmness/hardness), crumb properties and mouth feel, or more precisely, the attributes of bread as detected in the mouth during eating (e.g., bread softness/resistance to first bite, crumb moistness, crumb chewiness and gumminess, and crumb smoothness and melting properties).

Storage/Shelf Life

In one embodiment, the present invention relates to a bread having an improved shelf life.

Shelf life can measured as follows: A bread is prepared using the enzyme composition of the present invention (i.e., one or more anti-staling alpha-amylases and one or more raw starch degrading alpha-amylases) and compared to a control bread, that is, a bread prepared in the same way but without enzyme compositions of the present invention. The bread is stored in a sealed plastic bag at about 25° C. After the storage period, (e.g., 1 hour, 24 hours, 48 hours, 72 hours, 96 hours, 7 days, 21 days etc.), the hardness of the bread is measured using a texture analyzer and compared to a control bread stored under identical conditions. An improved shelf life is defined as a bread which is less hard (i.e., softer) than the control as measured by the texture analyzer.

In addition to preparing fresh bread dough or baked products, the present invention is directed to a method for preparing bread dough that can be stored, e.g., at room temperature or with refrigeration, or frozen prior to baking. The dough can stored and/or frozen after preparation of the dough and treatment by the enzyme combination of the present invention (i.e., prior to baking).

In one embodiment, the bread is also compared to a control and other enzymes treatments in various quality parameters. The bread prepared by the enzyme treatment of the present invention may be analyzed at a time after baking or during storage (e.g., 1 hour after baking and/or 24 hours, 48 hours, 72 hours, 96 hours, 7 days, 21 days etc. post baking). The bread prepared by the enzyme treatment of the present invention preferably has similar qualities in terms of crumb properties, such as pore uniformity, pore size, pore form, pore cell wall thickness, crumb colour, tenderness, softness, moistness, smoothness, chewiness, gumminess, firmness, and/or elasticity as compared to the control prepared with emulsifiers, such as, as measured using a texture analyzer and/or by sensory evaluation. The bread prepared by the enzyme treatment of the present invention preferably has improved qualities in terms of crumb properties, such as pore uniformity, pore size, pore form, pore cell wall thickness, crumb colour, tenderness, softness, moistness, smoothness, chewiness, gumminess, firmness, and/or elasticity as compared to the control prepared with emulsifiers.

The invention described and claimed herein is not to be limited in scope by the specific embodiments herein disclosed, since these embodiments are intended as illustrations of several aspects of the invention. Any equivalent embodiments are intended to be within the scope of this invention as well as combinations of one or more of the embodiments. Various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties. The present invention is further described by the following examples which should not be construed as limiting the scope of the invention. For example, routine modifications to optimize the methods of enzymatic modification according to the present invention are contemplated.

EXAMPLES

Materials and Methods

Maltogenic Alpha-Amylase Assay

The activity of a maltogenic alpha-amylase may be determined using an activity assay such as the MANU method. One MANU (Maltogenic Amylase Novo Unit) is defined as the amount of enzyme required to release one micro-mole of maltose per minute at a concentration of 10 mg of maltotriose substrate per ml in 0.1 M citrate buffer at pH 5.0, 37° C. for 30 minutes.

Acid Alpha-Amylase Activity (AFAU)

Alpha-amylase activity may be measured in AFAU (Acid Fungal Alpha-amylase Units), which are determined relative to an enzyme standard. 1 AFAU is defined as the amount of enzyme which degrades 5.260 mg starch dry matter per hour under the below mentioned standard conditions.

Acid alpha-amylase, an endo-alpha-amylase (1,4-alpha-D-glucan-glucanohydrolase, E.C. 3.2.1.1) hydrolyzes alpha-1,4-glucosidic bonds in the inner regions of the starch molecule to form dextrins and oligosaccharides with different chain lengths. The intensity of color formed with iodine is directly proportional to the concentration of starch. Amylase activity is determined using reverse colorimetry as a reduction in the concentration of starch under the specified analytical conditions.

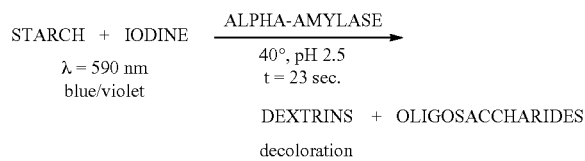

Standard Conditions/Reaction Conditions:
Substrate: Soluble starch, approx. 0.17 g/L
Buffer: Citrate, approx. 0.03 M
Iodine (12): 0.03 g/L
CaCl2: 1.85 mM
pH: 2.50±0.05
Incubation temperature: 40° C.
Reaction time: 23 seconds
Wavelength: 590 nm
Enzyme concentration: 0.025 AFAU/mL
Enzyme working range: 0.01-0.04 AFAU/mL Raw Starch Degrading Alpha-Amylase (Ra/Ga) Assay A protocol to obtain a raw starch degrading alpha-amylase index (Ra/Ga) value of the enzymes is as follows:

1) The assays are performed at a temperature of 40° C.
2) First, the pH profile of the enzyme is obtained on raw starch. The profile is obtained from the plotting of the % activity versus the pH. This optimum pH value is used in the assay.
3) Any type of starch may be used, such as, wheat, corn, barley, rice, etc. In an example, the raw starch used is corn starch. A 2% solution of raw starch is used. Alternatively, to obtain the gelatinized starch solution, a solution of raw starch is heated above the gelatinization temperature for at least 60 minutes. In the case of corn, the solution of raw starch is heated to 70° C. for at least 60 minutes.
4) The reaction solution contains the gelatinized starch (or raw starch) and a buffer. The composition of the buffer used in the assay depends on the pH optimum of the enzyme. The buffer composition and concentration must be identical for both the raw and gelatinized starch activity measurements.
5) The enzyme concentration used in the assay must be identical for both the raw and gelatinized starch activity measurements.
6) The enzyme activity is measured by determination of the reducing sugars in solution. Suitable methods are the following: The method of Bernfield for determining reducing sugars using dinitrosalicylic acid is described in Bernfield P., Methods Enzymology 1,149-158 (1955) and the method for determining reducing sugars with copper-bicinchoninate as described in Fox J. D. et al, Analytical Biochemistry 195,93-96 (1991) or in Waffenschmidt S. et al, Anal. Biochem. 165,337-340 (1987). Prior to the determination of reducing sugars, the solutions are boiled for 3 minutes and centrifugated to inactivate the enzyme.
7) The time for incubation to measure the enzyme activities is 6 hours.
8) The enzyme activity is expressed as the number reducing sugars produced per hour and per mg of pure active enzyme.
9) The activity on gelatinized starch is measured by measuring the release of glucose produced by the enzyme on a 2% gelatinized (e.g., corn) starch reaction mixture and the activity on raw starch is measured by measuring the release of glucose produced by the enzyme on a 2% raw (e.g., corn) starch reaction mixture. The activity is measured by the release of reducing sugars produced in mole per hour per mg of pure active enzyme.

Enzymes

A raw starch degrading alpha-amylase, the acid alpha-amylase disclosed in WO 2006/069290, table 5 as V039, and shown in SEQ ID NO: 1 herein.

An anti-staling alpha-amylase, the maltogenic alpha-amylase from *Bacillus stearothermophilus* (NOVAMYL), and shown in SEQ ID NO: 2 herein.

A phospholipase from *Thermomyces* sp. (LIPOPAN XTRA BG)

A lipase from *Humicola lanuginosa* (LIPOPAN 50 BG).

An alpha-amylase from *Aspergillus oryzae* (FUNGAMYL 2500 BG)

A xylanase from *Thermomyces lanuginosus* (PENTOPAN MONO BG)

A raw starch degrading alpha-amylase shown as SEQ ID: 3 herein.

EXAMPLES

Example 1

Bread was baked with the raw-starch degrading alpha-amylase V039 (RSDA/SEQ ID:1). As a reference, bread was also baked without the RSDA/SEQ ID:1 (control) and with the emulsifier sodium steroyl lactylate but without the RSDA/SEQ ID:1 (reference). All breads contained a common background of enzymes to ensure bread had quality properties comparable to those found in commercial breads.

The RSDA was used at a dosage of 18 mg per kg flour. SSL was used at a level of 0.375% on a flour basis, consistent with levels used in commercial bread. The common background of enzymes was composed of fungal alpha-amylase from *Aspergillus oryzae* (FUNGAMYL 2500 BG) at a dosage of 4 mg per kg flour, xylanase from *Thermomyces lanuginosus* (PENTOPAN MONO BG) at a dosage of 36 mg per kg flour, a maltogenic alpha-amylase from *Bacillus stearothermophilus* (NOVAMYL PRO 80 BG) at a dosage of 40 mg per kg flour.

Dough were prepared according to a standard European straight dough procedure with 40 g yeast, 20 g salt, 20 g sugar, 10 g distilled monoglycerides, 60 ppm ascorbic acid, and 4 g calcium propionate (as preservative) per kg of flour. The doughs were scaled to 700 g and baked in lidded pans.

The crumb firmness and elasticity were measured using a texture analyzer TA-XT2 from Stable Micro Systems. Crumb texture was measured according to a modified AACC method (American Cereal Chemists' Association). These measurements were made after 1 day after baking and again after 7 and 14 days storage (wrapped in thick polyethylene plastic bags and stored at 22° C.).

The results are shown as changes in crumb firmness and crumb elasticity versus additive and storage time.

SSL had no significant effects on crumb firmness as measured over a 14-day storage period. The RSDA at the dosage of 18 ppm significantly increased the firmness of bread on day 1 only. Thereafter, no difference in firmness observed between RSDA bread and SSL bread. At 14-day storage period RSDA bread was found to be firmer than the control but no different than SSL.

TABLE 1

Change in firmness [g-force] with storage time of white pan bread with SSL or with a raw-starch degrading alpha-amylase (mg per kg flour).

| Enzyme | Day 1 | Day 7 | Day 14 |
| --- | --- | --- | --- |
| No enzyme | 141a | 245a | 292a |
| 0.375% SSL | 129a | 236a | 306a |
| 18 mg RSDA | 176b | 256a | 315a |
| LSD | 21 | 41 | 48 |

Values in the same column followed by different letters are statistically different using Fisher's LSD test at a level of significant of 5%.
LSD = least significant difference.

SSL caused a significant decrease in crumb elasticity starting on day 1 and this effect was observed over a 14-day storage period. Surprisingly, the RSDA at the dosage of 18 ppm also caused a significant decrease in bread crumb elasticity and the effect, as it was the case of SSL, was observed over a 14-day storage period.

TABLE 2

Change in elasticity [g-force/g-force] with storage time of white pan bread with SSL or with a raw-starch degrading alpha-amylase (mg per kg flour).

| Enzyme | Day 1 | Day 7 | Day 14 |
| --- | --- | --- | --- |
| No enzyme | 68.0a | 65.1a | 64.6a |
| 0.375% SSL | 64.9b | 63.7b | 61.8b |
| 18 mg RSDA | 65.5b | 64.1b | 63.5b |
| LSD | 1.0 | 0.9 | 0.4 |

[1]Values in the same column followed by different letters are statistically different using Fisher's LSD test at a level of significant of 5%.
LSD = least significant difference.

Example 2

A baking test was made as in Example 1, but the breads were made with a leaner recipe by removing the maltogenic alpha-amylase and the distilled monoglycerides ingredient. The results are given as crumb firmness and crumb elasticity after storage.

SSL had no significant effects on crumb firmness as measured over a 14-day storage period. The RSDA/SEQ ID:1 at the dosage of 18 ppm significantly increased the firmness of bread starting on day 1 and this effect was observed over a 14-day storage period.

TABLE 3

Change in firmness [g-force] with storage time of white pan bread with SSL or with a raw-starch degrading alpha-amylase (mg per kg flour).

| Enzyme | Day 1 | Day 7 | Day 14 |
| --- | --- | --- | --- |
| No enzyme | 174a | 526a | 637a |
| 0.375% SSL | 187a | 481a | 567a |
| 18 mg RSDA | 238b | 626a | 729b |
| LSD | 41 | 101 | 88 |

Values in the same column followed by different letters are statistically different using Fisher's LSD test at a level of significant of 5%.
LSD = least significant difference.

SSL caused a significant decrease in crumb elasticity starting on day 1 and this effect was observed over a 14-day storage period. Surprisingly, the RSDA at the dosage of 18 ppm also caused a significant decrease in bread crumb elasticity and the effect, as it was the case of SSL, was observed over a 14-day storage period.

TABLE 4

Change in elasticity [g-force/g-force] with storage time of white pan bread with SSL or with a raw-starch degrading alpha-amylase (mg per kg flour).

| Enzyme | Day 1 | Day 7 | Day 14 |
| --- | --- | --- | --- |
| No enzyme | 69.0a | 62.7a | 60.6a |
| 0.375% SSL | 65.3b | 61.4b | 60.1a |
| 18 mg RSDA | 64.8b | 60.0b | 57.8b |
| LSD[2] | 1.0 | 0.9 | 1.4 |

Values in the same column followed by different letters are statistically different using Fisher's LSD test at a level of significant of 5%.
LSD = least significant difference.

Example 3

Bread was baked with the raw-starch degrading alpha-amylase (RSDA/SEQ ID:1) in combination with a phospholipase and a lipase. As a reference, bread was baked with SSL but without RSDA/SEQ ID:1 (reference). All breads contained a common background of enzymes to ensure bread had quality properties comparable to those found in commercial breads.

The raw-starch degrading alpha-amylase (RSDA/SEQ ID:1) was used at a dosage of 20, 25, 30 and 35 mg per kg flour. The phospholipase used was from *Thermomyces* sp. (Lipopan® Xtra BG) at a dosage of 20, 25, 30 or 35 mg per kg flour. The lipase was from *Humicola lanuginosa* (Lipopan® 50 BG) at a dosage of 20, 25, 30 or 35 mg per kg flour. SSL was used at a level of 0.35% on a flour basis, consistent with levels found in commercial bread. The common background of enzymes was composed of fungamyl alpha-amylase from *Aspergillus oryzae* (Fungamyl® 2500 BG) at a dosage of 6 mg per kg flour, xylanase from *Bacillus* Sp. (Panzea® BG) at a dosage of 30 mg per kg flour, a maltogenic alpha-amylase from *Bacillus stearothermophilus* (Novamyl 10000 BG) at a dosage of 50 mg per kg flour.

Doughs were prepared according to a standard European straight dough procedure with 40 g yeast, 20 g salt, 20 g sugar, 60 ppm ascorbic acid, and 4 g calcium propionate (as preservative) per kg of flour. The doughs were scaled to 700 g and baked in lidded pans.

To evaluate the properties of the bread crumb properties, a panel of at least three persons was used to assess the qualities of the bread. A loaf of bread (2 h after baking) was broken into two halves and the crumb of which was compared to that of the reference. Evaluation was performed with bread that had cooled down to room temperature. A 10-point system based on Table 5 below was used to score the quality parameters of interest with the score of the reference being 5. The higher the score, the better the quality of the bread.

TABLE 5

Bread evaluation criteria

| Crust color | 0/Light | 5/Reference | 10/Dark |
| --- | --- | --- | --- |
| Internal crumb properties | | | |
| Pore uniformity | 0/Less | 5/Reference | 10/More |
| Pore size | 0/Open | 5/Reference | 10/Fine |
| Pore cell wall thickness | 0/Thick | 5/Reference | 10/Thin |

TABLE 5-continued

Bread evaluation criteria

| Pore form | 0/Round/Deep | 5/Reference | 10/Elongated/Shallow |
| Crumb color | 0/Dark/Gray | 5/Reference | 10/Light/Bleached |

The breads were evaluated after 1 day after baking and again after 7 and 14 days storage (wrapped in thick polyethylene plastic bags and stored at 22° C.) using sensory evaluation and instrumental texture evaluation.

The crumb firmness and elasticity were measured using a texture analyzer TA-XT2 from Stable Micro Systems. Crumb texture was measured according to a modified AACC method (American Cereal Chemists' Association). The results are shown as changes in crumb firmness and crumb elasticity versus additive and storage time.

Sensory evaluation was subjective and was conducted in blind using a 9-point scale whereby a score of 5 corresponded to the sensory attributes of the reference bread at any given date. Higher scores denoted improved sensory attributes and lower scores inferior sensory attributes. The evaluators examined and scored by touch the tenderness by pressing the bread with the fingers. The eating properties of the bread in the mouth was also examined and scored in terms of bread softness (resistance to first bite) and in terms of moistness, chewiness-gumminess and crumb melting-smoothness, according to the guidelines set out by Watts B. M., Ylimaki G. L., Jeffery L. E., and Elias L. G. (1989), 1$^{st}$ Edition, Basic Sensory Methods for Food Evaluation. International Development Research Center, Ottawa, Canada.

TABLE 6

External appearance and internal crumb properties of white pan bread with SSL or with different enzyme treatments per kg flour.

| Enzyme | Crust color | Pore uniformity | Pore size | Pore cell wall thickness | Pore form | Crumb color | Overall |
|---|---|---|---|---|---|---|---|
| 0.35% SSL | 5 | 5 | 5 | 5 | 5 | 5 | 5 |
| 20 mg Lipopan Xtra + 20 mg RSDA | 5 | 4.5 | 4.5 | 5 | 5 | 5 | 4.8 |
| 25 mg Lipopan Xtra + 25 mg RSDA | 5 | 4.5 | 4.5 | 5 | 5 | 5 | 4.8 |
| 30 mg Lipopan Xtra + 30 mg RSDA | 5 | 4.5 | 4.5 | 5 | 5 | 5 | 4.8 |
| 35 mg Lipopan Xtra + 35 mg RSDA | 5 | 4.5 | 4.5 | 5 | 5 | 5 | 4.8 |
| 20 mg Lipopan Xtra + 20 mg Lipopan 50 + 20 mg RSDA | 5 | 5 | 5.5 | 5.5 | 5 | 5 | 5.2 |
| 25 mg Lipopan Xtra + 25 mg Lipopan 50 + 25 mg RSDA | 5 | 5 | 5.5 | 5.5 | 5 | 5 | 5.2 |
| 30 mg Lipopan Xtra + 30 mg Lipopan 50 + 30 mg RSDA | 5 | 5 | 5.5 | 5.5 | 5 | 5 | 5.2 |
| 35 mg Lipopan Xtra + 35 mg Lipopan 50 + 35 mg RSDA | 5 | 5 | 5.5 | 5.5 | 5 | 5 | 5.2 |
| LSD[1] | | | | | | | 0.22 |

[1]LSD = least significant difference.

TABLE 7

Change in sensory attributes with storage time of bread with SSL or with varying amounts of enzymes per kg flour.

| | 0.35% SSL | 20 ppm Lipopan Xtra + 20 ppm RSDA | 25 ppm Lipopan Xtra + 25 ppm RSDA | 30 ppm Lipopan Xtra + 30 ppm RSDA | 35 ppm Lipopan Xtra + 35 ppm RSDA | 20 ppm Lipopan Xtra + 20 ppm RSDA + 20 ppm Lipopan 50 | 25 ppm Lipopan Xtra + 25 ppm RSDA + 25 ppm Lipopan 50 | 30 ppm Lipopan Xtra + 30 ppm RSDA + 30 ppm Lipopan 50 | 35 ppm Lipopan Xtra + 35 ppm RSDA + 35 ppm Lipopan 50 |
|---|---|---|---|---|---|---|---|---|---|
| Sensory evaluation of day 1 | | | | | | | | | |
| Touch/Tactile Properties: | | | | | | | | | |
| Bread tenderness | 5 | 5 | 5 | 5 | 5 | 5 | 5 | 5 | 5 |
| Eating properties: | | | | | | | | | |
| Bread softness | 5 | 5 | 5 | 5 | 5 | 5 | 5 | 5 | 5 |
| Bread moistness | 5 | 5 | 5 | 5 | 5 | 5 | 5 | 5 | 5 |
| Bread chewiness/gumminess | 5 | 5.5 | 5 | 4.5 | 5 | 5 | 5 | 5 | 4.5 |

TABLE 7-continued

Change in sensory attributes with storage time of bread with SSL or with varying amounts of enzymes per kg flour.

|  | 0.35% SSL | 20 ppm Lipopan Xtra + 20 ppm RSDA | 25 ppm Lipopan Xtra + 25 ppm RSDA | 30 ppm Lipopan Xtra + 30 ppm RSDA | 35 ppm Lipopan Xtra + 35 ppm RSDA | 20 ppm Lipopan Xtra + 20 ppm RSDA + 20 ppm Lipopan 50 | 25 ppm Lipopan Xtra + 25 ppm RSDA + 25 ppm Lipopan 50 | 30 ppm Lipopan Xtra + 30 ppm RSDA + 30 ppm Lipopan 50 | 35 ppm Lipopan Xtra + 35 ppm RSDA + 35 ppm Lipopan 50 |
|---|---|---|---|---|---|---|---|---|---|
| Bread crumb/melting & smoothness | 5 | 5.5 | 5 | 4.5 | 5 | 5 | 5 | 5 | 4.5 |
| Overall Bread quality LSD[1] 0.39 | 5 | 5.2 | 5 | 4.8 | 5 | 5 | 5 | 5 | 4.8 |

Sensory evaluation of day 7

| Touch/Tactile Properties: | | | | | | | | | |
|---|---|---|---|---|---|---|---|---|---|
| Bread tenderness | 5 | 5 | 5 | 5 | 5 | 5 | 5 | 5 | 5 |
| Eating properties: | | | | | | | | | |
| Bread softness | 5 | 5 | 5 | 5 | 5 | 5 | 5 | 5 | 5 |
| Bread moistness | 5 | 5 | 5 | 5.5 | 5.5 | 5 | 5 | 5.5 | 5.5 |
| Bread chewiness/gumminess | 5 | 5 | 5 | 5.5 | 5.5 | 5 | 5 | 5.5 | 5.5 |
| Bread crumb/melting & smoothness | 5 | 4.5 | 4.5 | 4.5 | 4.5 | 5 | 5 | 5 | 5 |
| Overall Bread quality LSD[1] 0.37 | 5 | 4.9 | 4.9 | 5.1 | 5.1 | 5 | 5 | 5.2 | 5.2 |

Sensory evaluation of day 14

| Touch/Tactile Properties: | | | | | | | | | |
|---|---|---|---|---|---|---|---|---|---|
| Bread tenderness | 5 | 5 | 5 | 5 | 5 | 5 | 5 | 5 | 5 |
| Eating properties: | | | | | | | | | |
| Bread softness | 5 | 4.5 | 4.5 | 5 | 5 | 5 | 5 | 5 | 5 |
| Bread moistness | 5 | 5 | 5 | 5 | 5.5 | 5 | 5 | 5.5 | 6 |
| Bread chewiness/gumminess | 5 | 5 | 4.5 | 5 | 5 | 5 | 5 | 5 | 5 |
| Bread crumb/melting & smoothness | 5 | 5 | 5 | 5 | 5 | 5 | 5 | 5.5 | 5.5 |
| Overall Bread quality LSD[1] 0.86 | 5 | 4.9 | 4.8 | 5 | 5.1 | 5 | 5 | 5.2 | 5.3 |

[1] LSD = least significant difference.

TABLE 8

Change in firmness [g-force] with storage time of white pan bread with SSL or with different enzyme treatments per kg flour.

| Enzyme | Day 1 | Day 7 | Day 14 |
|---|---|---|---|
| 0.35% SSL | 121 | 229 | 316 |
| 20 mg Lipopan Xtra + 20 mg RSDA | 141 | 261 | 340 |
| 25 mg Lipopan Xtra + 25 mg RSDA | 136 | 253 | 356 |
| 30 mg Lipopan Xtra + 30 mg RSDA | 143 | 264 | 340 |
| 35 mg Lipopan Xtra + 35 mg RSDA | 125 | 248 | 356 |
| 20 mg Lipopan Xtra + 20 mg Lipopan 50 + 20 mg RSDA | 160 | 300 | 360 |
| 25 mg Lipopan Xtra + 25 mg Lipopan 50 + 25 mg RSDA | 179 | 295 | 373 |
| 30 mg Lipopan Xtra + 30 mg Lipopan 50 + 30 mg RSDA | 174 | 286 | 349 |
| 35 mg Lipopan Xtra + 35 mg Lipopan 50 + 35 mg RSDA | 156 | 291 | 380 |
| LSD[1] | 31 | 37 | 37 |

[1] LSD = least significant difference.

TABLE 9

Change in elasticity [g-force/g-force] with storage time of white pan bread with SSL or with different enzyme treatments per kg flour.

| Enzyme | Day 1 | Day 7 | Day 14 |
|---|---|---|---|
| 0.35% SSL | 69.7 | 66.6 | 64.8 |
| 20 mg Lipopan Xtra + 20 mg RSDA | 67.5 | 65.5 | 64.2 |
| 25 mg Lipopan Xtra + 25 mg RSDA | 67.5 | 65.6 | 63.0 |
| 30 mg Lipopan Xtra + 30 mg RSDA | 67.6 | 65.0 | 63.3 |

TABLE 9-continued

Change in elasticity [g-force/g-force] with storage time of white pan bread with SSL or with different enzyme treatments per kg flour.

| Enzyme | Day 1 | Day 7 | Day 14 |
|---|---|---|---|
| 35 mg Lipopan Xtra + 35 mg RSDA | 67.6 | 65.3 | 63.1 |
| 20 mg Lipopan Xtra + 20 mg Lipopan 50 + 20 mg RSDA | 68.3 | 65.2 | 63.2 |
| 25 mg Lipopan Xtra + 25 mg Lipopan 50 + 25 mg RSDA | 67.7 | 65.1 | 62.8 |
| 30 mg Lipopan Xtra + 30 mg Lipopan 50 + 30 mg RSDA | 67.1 | 64.7 | 62.8 |
| 35 mg Lipopan Xtra + 35 mg Lipopan 50 + 35 mg RSDA | 67.4 | 65.0 | 63.2 |
| LSD[1] | 0.96 | 0.86 | 1.48 |

[1]LSD = least significant difference.

Example 4

Comparison of Breads Baked According to the in Chorleywood Bread Process

Bread was baked according to the in Chorleywood bread process (CBP) lidded pans method using the following recipe and process.

Recipe:

| Ingredient | % on flour basis |
|---|---|
| Ascorbic acid | 150 ppm |
| Yeast | 4 |
| Salt | 2 |
| Sucrose | 1 |
| Water | 60 (to be optimized for each flour) |
| Soy flour | 0.5 |
| Calcium propionate | 0.2 |
| Wheat flour (Meneba Kolibri) | 100 |
| +enzymes according to Table 10 Dosages enzyme | |

Procedure:
1. Scaling of ingredients
2. Addition of all ingredient except water and enzymes into the mixer bowl.
3. Temperature adjustment (in order to reach the target temperature of the final dough), scaling and addition of water into mixer bowl
4. Addition of enzymes according to Table 10, a dummy dough was run before in order heat up the equipment and ensure that all doughs were treated in the same way.
5. The ingredients were mixed into dough using a High speed mixer pressure vacuum K5 to an energy input of 11 watt/kg dough, at a mixing speed of 410 rpm. A 0.5 bar vacuum was added after 30% of the mixing energy input had been reached.
6. The dough was taken from the mixer bowl and the temperature was determined (Target temperature of the final dough 30+/−0.5° C.).
7. The dough was given 5 min bench-time under plastic cover and a dough evaluation was performed
8. The dough was scaled (700 g/bread) and rounded by hand.
9. The dough was given 7 min bench-time under plastic cover.
10. The doughs for bread were shaped into a cylinder using a Winkler LR 67 sheeter, the dough cylinder were cut horizontally into four equal pieces all 4 pieces are turned 90° along the vertical axis, all four pieces were put together and transferred to pans which were put on baking sheet.
11. The doughs were proofed at 40° C., 80-90% rh for 60 min. The doughs was baked into bread for 24 min at 230° C.
12. The bread was taken out of the pans after baking and put on a baking sheet.
13. The bread was allowed to cool down for 2 hours and packed sealed plastic bags in $N_2$ and $CO_2$ atmosphere.
14. The bread was evaluated regarding volume, external and internal bread evaluation.

Dough Evaluation

The dough properties were evaluated after 5 min bench time using the parameters, definitions and evaluation methods as described in Table 11 below. A scale between 0-10 was used where the control dough (dough 1 with only background enzymes added) was given the score 5 and the other doughs were evaluated relative to the control. The further away from the control the dough was judged to be, the higher/lower score the dough was given.

TABLE 10

| Dough | Dummy | 1 | 2 | 3 | 4 | 5 | 6 | 7 | 8 | 9 |
|---|---|---|---|---|---|---|---|---|---|---|
| SSL (%) | | | | | | | 0.35 | | 0.35 | |
| DMG (%) | | | | | | | | 0.5 | 0.5 | 1 |
| Lipopan Xtra BG (ppm) | | | 55 | 62.5 | 70 | 77.5 | | | | |
| Lipopan 50 BG (ppm) | | | 15 | 22.5 | 30 | 37.5 | | | | |
| RSDA (SEQ ID NO: 1) (ppm) | | | 10 | 15 | 20 | 25 | | | | |
| Novamyl 10000 BG (ppm) | 50 | 50 | 50 | 50 | 50 | 50 | 50 | 50 | 50 | 50 |
| Panzea Dual BG (ppm) | 30 | 30 | 30 | 30 | 30 | 30 | 30 | 30 | 30 | 30 |

TABLE 11

Dough evaluation

| Parameters | Definition | Evaluation method | Scale |
|---|---|---|---|
| Stickiness | The degree to which a dough adheres to ones hands or other surfaces | A 3 cm deep cut is made in the middle of the dough. Stickiness is measured in this cut by evaluating how much the dough sticks to the hand when the whole palm of the hand is pushed down and withdraw. | Less sticky 0-4<br>Control 5<br>More sticky 6-10 |
| Softness | The degree to, or ease with, which a dough will compress or resist compression | Is measured by squeezing and feeling the dough | Less soft 0-4<br>Control 5<br>More soft 6-10 |
| Elasticity | The ability of a dough to resist stretching as well as to return to its original size and shape when the force is removed | The dough is pulled gently to feel the resistance/the elasticity. | Less elastic 0-4<br>Control 5<br>More elastic 6-10 |
| Extensibility | The degree to which a dough can be stretched without tearing | The dough is gently stretched to form a "window" to feel the extensibility | Less extensible 0-4<br>Control 5<br>More extensible 6-10 |

External and Internal Bread Evaluation

The external and internal bread properties were evaluated using the parameters, definitions and evaluation methods as described in Table 12 and Table 13 below. A scale between 0-10 was used where the control bread (bread from dough 1 with only background enzymes added) was given the score 5 and the other breads were evaluated relative to the control. The further away from the control the bread was judged to be, the higher/lower score the bread was given.

TABLE 12

External bread evaluation

| Parameters | Definition | Evaluation method | Scale |
|---|---|---|---|
| Crust color | Degree of crust browning | The bread are placed beside each other and the color intensity is evaluated visually | Less dark 0-4<br>Control 5<br>More dark 6-10 |

Internal Bread Evaluation

Breads were sliced on a toast slicer (Daub Verhoeven, NL) to approx. to 12.5 mm thick slices. Bread slices were placed beside each other for visual evaluation.

TABLE 13

Internal bread evaluation

| Parameters | Definition | Evaluation method | Scale |
|---|---|---|---|
| Uniformity | Describes the cell size uniformity | Visually evaluation of uniformity | Less uniform 0-4<br>Control 5<br>More uniform 6-10 |
| Cell size | Describes the size of the crumb cells | Visually evaluation of cell size | Larger cells 0-4<br>Control 5<br>Smaller cells 6-10 |
| Cell wall | Describes the thickness of the cell walls | Visually evaluation of the cell thickness | Thicker cell walls 0-4<br>Control 5<br>Thinner cell wall 6-10 |
| Cell form | Describes the shape and the depth of the cells which can be from round to elongated | Visually evaluation of the cell form | Rounder 0-4<br>Control 5<br>More elongated 6-10 |
| Crumb color | The degree of lightness of the crumb | Visually evaluation of the lightness | Darker 0-4<br>Control 5<br>Brighter 6-10 |

Texture

Bread texture properties are mainly characterized by firmness (the same as "hardness" and the opposite of "softness") and the elasticity of the baked product. Firmness and elasticity can be measured using a texture profile analyzer such as from TA-XT plus texture analyzer from Stable Micro Systems, UK. A standard method for measuring firmness and elasticity is based on force-deformation of the baked product. A force-deformation of the baked products may be performed with a 40 mm diameter cylindrical probe. The force on the cylindrical probe is recoded as it is pressed down 7 mm into a 25 mm thick bread slice at a deformation speed of 1 mm/second. The probe is then kept in this position for 30 seconds while the force is recorded and then probe returns to its original position.

Softness (in grams) is defined as the force needed to compress a probe 6.25 mm into a bread crumb slice of 25 mm thickness.

Elasticity (in %) is defined as the force recoded after 30 seconds compression at 7 mm (Force at time=37 s) divided by the force needed to press the probe 7 mm into the crumb (Force at time=7 s) times 100.

Sensory Evaluation of the Bread

The bread properties were evaluated on day 1, 7 and 14 after baking using the parameters, definitions and evaluation methods as described in Table 14 below. Breads were sliced on a toast slicer (Daub Verhoeven, NL) to approx. to 12.5 mm thick slices. A scale between 0-10 was used where the control bread (bread from dough 1 with only background enzymes added) was given the score 5 and the other doughs were evaluated relative to the control. The further away from the control the dough was judged to be, the higher/lower score the dough was given.

TABLE 14

| | Sensory evaluation of bread crumb | | |
|---|---|---|---|
| Parameters | Definition | Evaluation method | Scale |
| Bread tenderness | Bread crumb softness to the touch | Use 3 fingers to compress the bread crumb of one slice of bread. Evaluate the force needed compress the bread crumb. | More force 0-4 Control 5 Less force 6-10 |
| Bread softness | Bread crumb softness of the first bite | Fold a slice of bread once and take a bite. Evaluate the force needed to make the 1$^{st}$ bite. | Firmer 0-4 Control 5 Softer 6-10 |
| Bread moistness | Bread crumb moistness in the mouth | Take a bite of the bread slice and evaluated the amount of saliva needed to chew the bread. | Less moist 0-4 Control 5 More moist 6-10 |
| Bread chewiness/gumminess | Bread crumb chewiness during mastication | Take a bite of the bread slice and count the number of chews needed until the bread is ready to be swallowed. | Less chewy 0-4 Control 5 More chewy 6-10 |
| Bread crumb melting & smoothness | Bread crumb melting during mastication | Emphasize how smooth sample is when rubbed between the tongue and palate during mastication and swallowing and evaluating as well the melting of the sample | Less smooth 0-4 Control 5 More smooth 6-10 |

Results

The results from the baking trial were as follows:

TABLE 15

| | Dough parameters | | | | | | | | |
|---|---|---|---|---|---|---|---|---|---|
| Evaluation after Mixing | Control | 0.35% SSL | 0.5% DMG | 55 ppm Lipopan Xtra + 10 ppm JA126 + 15 ppm Lipopan 50 | 62.5 ppm Lipopan Xtra + 15 ppm JA126 + 22.5 ppm Lipopan 50 | 70 ppm Lipopan Xtra + 20 ppm JA126 + 30 ppm Lipopan 50 | 77.5 ppm Lipopan Xtra + 25 ppm JA126 + 37.5 ppm Lipopan 50 | 0.35% SSL + 0.5% DMG | 1% DMG |
| Stickiness LSD 0.54 | 5 | 4 | 5 | 5 | 4 | 4 | 4 | 4.5 | 5 |
| Softness LSD 0.54 | 5 | 4 | 5 | 5 | 4.5 | 4 | 4 | 5 | 5 |
| Extensibility LSD 0.98 | 5 | 4.5 | 5 | 5 | 4.5 | 4 | 4 | 4.5 | 5 |
| Elasticity LSD 0.98 | 5 | 5.5 | 5 | 5 | 5.5 | 6 | 6 | 5.5 | 5 |

The combinations of the lipase, phospholipase and raw starch hydrolyzing amylase (RSDA) in different combinations resulted in a less soft (firmer) and less sticky (drier) dough.

Texture

TABLE 16

| | Softness | | | | | | | | | |
|---|---|---|---|---|---|---|---|---|---|---|
| Softness Days | Control | 0.35% SSL | 0.5% DMG | 55 ppm Lipopan Xtra + 10 ppm JA126 + 15 ppm Lipopan 50 | 62.5 ppm Lipopan Xtra + 15 ppm JA126 + 22.5 ppm Lipopan 50 | 70 ppm Lipopan Xtra + 20 ppm JA126 + 30 ppm Lipopan 50 | 77.5 ppm Lipopan Xtra + 25 ppm JA126 + 37.5 ppm Lipopan 50 | 0.35% SSL + 0.5% DMG | 1% DMG | LSD |
| 1 | 152 | 125 | 128 | 179 | 182 | 190 | 191 | 127 | 125 | 20 |
| 7 | 301 | 238 | 262 | 288 | 310 | 319 | 303 | 205 | 234 | 56 |
| 14 | 355 | 309 | 306 | 360 | 393 | 405 | 402 | 281 | 308 | 54 |

TABLE 17

| | Elasticity | | | | | | | | | |
|---|---|---|---|---|---|---|---|---|---|---|
| Elasticity Days | Control | 0.35% SSL | 0.5% DMG | 55 ppm Lipopan Xtra + 10 ppm JA126 + 15 ppm Lipopan 50 | 62.5 ppm Lipopan Xtra + 15 ppm JA126 + 22.5 ppm Lipopan 50 | 70 ppm Lipopan Xtra + 20 ppm JA126 + 30 ppm Lipopan 50 | 77.5 ppm Lipopan Xtra + 25 ppm JA126 + 37.5 ppm Lipopan 50 | 0.35% SSL + 0.5% DMG | 1% DMG | LSD |
| 1 | 70.6 | 68.5 | 69.4 | 68.3 | 67.5 | 67.4 | 67.2 | 66.8 | 67.8 | 1.0 |
| 7 | 66.9 | 64.4 | 65.6 | 63.6 | 63.3 | 63.4 | 62.9 | 63.6 | 64.7 | 0.9 |
| 14 | 65.3 | 63.6 | 64.0 | 62.4 | 61.5 | 61.9 | 61.7 | 62.4 | 63.2 | 1.1 |

The combinations of the lipase, phospholipase and raw starch hydrolyzing amylase (RSDA) in different combinations all had a crumb elasticity lowering effect compared to both the Control bread and bread with the baking emulsifiers SSL and DMG.

TABLE 18

| Breads: | Control | 0.35% SSL | 0.5% DMG | 55 ppm Lipopan Xtra + 10 ppm JA126 + 15 ppm Lipopan 50 | 62.5 ppm Lipopan Xtra + 15 ppm JA126 + 22.5 ppm Lipopan 50 | 70 ppm Lipopan Xtra + 20 ppm JA126 + 30 ppm Lipopan 50 | 77.5 ppm Lipopan Xtra + 25 ppm JA126 + 37.5 ppm Lipopan 50 | 0.35% SSL + 0.5% DMG | 1% DMG |
|---|---|---|---|---|---|---|---|---|---|
| External | | | | | | | | | |
| Crust Color: | 5 | 5 | 5 | 5 | 5 | 5 | 5 | 5 | 5 |
| Internal | | | | | | | | | |
| Uniformity | 5 | 7.5 | 5.5 | 6.5 | 6.5 | 7 | 7 | 7 | 5 |
| Cell Size | 5 | 6.5 | 5.5 | 6.5 | 6.5 | 6.5 | 6.5 | 7.5 | 6 |
| Cell Wall | 5 | 7 | 5.5 | 6.5 | 6.5 | 6.5 | 6.5 | 7.5 | 6 |
| Cell Form | 5 | 5 | 5 | 5 | 5 | 5 | 5 | 5 | 5 |
| Crumb Color | 5 | 6.5 | 6 | 6.5 | 6.5 | 6.5 | 6.5 | 6.5 | 6 |
| Av. crumb LSD 0.54 | 5 | 6.5 | 5.5 | 6.2 | 6.2 | 6.3 | 6.3 | 6.7 | 5.6 |

The combinations of the lipase, phospholipase and raw starch hydrolyzing amylase (RSDA) in different combinations improved the different bread quality parameters (More uniform, smaller cells, thinner cell walls and brighter crumb color)

TABLE 19

| | Legend | Control | 0.35% SSL | 0.5% DMG | 55 ppm Lipopan Xtra + 10 ppm JA126 + 15 ppm | 62.5 ppm Lipopan Xtra + 15 ppm JA126 + 22.5 ppm | 70 ppm Lipopan Xtra + 20 ppm JA126 + 30 ppm | 77.5 ppm Lipopan Xtra + 25 ppm JA126 + 37.5 ppm | 0.35% SSL + 0.5% DMG | 1% DMG |
|---|---|---|---|---|---|---|---|---|---|---|
| Sensory evaluation of day: | 1 | 10. Okt 12 | | | | | | | | |
| Touch/Tactile Properties: | | | | | | | | | | |
| Bread tenderness | | 5 | 6.5 | 6 | 6 | 6 | 6 | 6 | 7 | 6 |
| Eating properties: | | | | | | | | | | |
| Bread softness | | 5 | 7.5 | 6 | 6.5 | 6.5 | 7 | 7 | 8.5 | 7.5 |
| Bread moistness | | 5 | 7 | 6 | 6 | 6 | 7 | 7.5 | 7 | 6.5 |
| Bread chewiness/gumminess | | 5 | 7 | 6 | 6 | 6 | 7 | 8 | 7 | 6.5 |
| Bread crumb/melting &smoothness | | 5 | 6.5 | 6 | 6 | 6 | 6.5 | 6.5 | 6.5 | 6 |
| Overall Bread quality LSD 0.56 | | 5 | 6.9 | 6 | 6.1 | 6.1 | 6.7 | 7 | 7.2 | 6.5 |
| Sensory evaluation of day: | 7 | 16. Okt 12 | | | | | | | | |
| Touch/Tactile Properties: | | | | | | | | | | |
| Bread tenderness | | 5 | 8.5 | 6 | 7.5 | 7.5 | 7.5 | 7 | 8.5 | 7 |
| Eating properties: | | | | | | | | | | |
| Bread softness | | 5 | 8 | 6.5 | 7 | 7 | 7 | 7 | 9 | 7.5 |
| Bread moistness | | 5 | 7.5 | 6 | 7 | 7 | 8 | 8.5 | 7.5 | 7 |
| Bread chewiness/gumminess | | 5 | 7.5 | 6.5 | 7 | 7 | 7.5 | 7.5 | 8 | 7 |
| Bread crumb/melting &smoothness | | 5 | 8.5 | 6 | 7.5 | 7.5 | 7.5 | 7 | 8.5 | 7 |

TABLE 19-continued

Sensory evaluation

| | Legend | Control | 0.35% SSL | 0.5% DMG | 55 ppm Lipopan Xtra + 10 ppm JA126 + 15 ppm | 62.5 ppm Lipopan Xtra + 15 ppm JA126 + 22.5 ppm | 70 ppm Lipopan Xtra + 20 ppm JA126 + 30 ppm | 77.5 ppm Lipopan Xtra + 25 ppm JA126 + 37.5 ppm | 0.35% SSL + 0.5% DMG | 1% DMG |
|---|---|---|---|---|---|---|---|---|---|---|
| Overall Bread quality LSD 0.52 | | 5 | 8 | 6.2 | 7.2 | 7.2 | 7.5 | 7.4 | 8.3 | 7.1 |
| Sensory evaluation of day: Touch/Tactile Properties: | 14 | 23. Okt 12 | | | | | | | | |
| Bread tenderness Eating properties: | | 5 | 8 | 7 | 8 | 7 | 7 | 7 | 8 | 6.5 |
| Bread softness | | 5 | 7.5 | 6 | 7 | 6.5 | 6.5 | 6.5 | 7.5 | 6 |
| Bread moistness | | 5 | 7 | 6 | 6.5 | 7 | 7 | 7.5 | 7 | 6 |
| Bread chewiness/gumminess | | 5 | 7.5 | 6.5 | 7.5 | 7 | 7 | 7 | 7.5 | 6 |
| Bread crumb/melting & smoothness | | 5 | 7 | 6.5 | 7 | 7 | 7 | 7 | 7.5 | 6.5 |
| Overall Bread quality LSD 1.04 | | 5 | 7.4 | 6.4 | 7.2 | 6.9 | 6.9 | 7 | 7.5 | 6.2 |

The combinations of the lipase, phospholipase and raw starch hydrolyzing amylase (RSDA) in different combinations improved the sensory parameters of the bread crumb during the whole studied period (day 1-14) giving softer bread by hand and mouth, moister, more chewy and more smooth texture.

Conclusion

The combinations of the lipase, phospholipase and raw starch hydrolyzing amylase (RSDA) in different combinations outperformed bread with no emulsifiers (control), SSL and/or DMG with regards to crumb resilience. The reduced resilience in combination with better moistness and melting properties seems to be able to compensate the slightly firmer crumb structure and provides over all equal freshness properties comparable with SSL.

Example 5

Whole wheat bread was baked with raw-starch degrading alpha-amylase (RSDA) in combination with a phospholipase and a lipase. As a control, bread was baked with without RSDA, phospholipase and lipase. All breads contained a common background of enzymes to ensure bread had quality properties comparable to those found in commercial breads.

The two raw-starch degrading alpha-amylases were used at a dosage of 20 mg (RSDA/SEQ ID:1) and 10 mg (RSDA/SEQ ID:3) mg per kg flour. The phospholipase used was from $Thermomyces$ sp. (Lipopan® Xtra BG) at a dosage of 20 mg per kg flour. The lipase was from $Humicola$ $lanuginosa$ (Lipopan® 50 BG) at a dosage of 20 mg per kg flour. The common background of enzymes was composed of alpha-amylase and xylanase (Panzea Duall® BG) at a dosage of 20 mg per kg flour.

Doughs were prepared according to a standard European straight dough procedure with 30 g yeast, 20 g salt, 10 g sugar, 60 ppm ascorbic acid, and 2.5 g calcium propionate (as preservative) per kg of flour. The doughs were scaled to 500 g and baked in lidded pans.

The crumb firmness and elasticity were measured using a texture analyzer TA-XT2 from Stable Micro Systems. Crumb texture was measured according to a modified AACC method (American Cereal Chemists' Association). These measurements were made after 1 day after baking and again after 4 and 7 days storage (wrapped in thick polyethylene plastic bags and stored at 22° C.).

The results are shown as changes in crumb firmness and crumb elasticity versus additive and storage time. The combinations of RSDA, lipase and phospholipase resulted in significant decrease in bread crumb elasticity starting at day 1 and the effect was observed over a 7-day storage period.

TABLE 20

Change in firmness [g-force] with storage time of whole wheat pan bread without enzyme and with different enzyme treatments per kg flour.

| Enzyme | Day 1 | Day 4 | Day 7 |
|---|---|---|---|
| Control | 326a | 526a | 697a |
| 20 mg RSDA (SEQ ID: 1) + 20 mg Lipopan Xtra + 20 mg Lipopan 50 | 295ab | 576a | 732a |
| 10 mg RSDA (SEQ ID: 3) + 20 mg Lipopan Xtra + 20 mg Lipopan 50 | 257b | 549a | 672a |

Values in the same column followed by different letters are statistically different using Tukey-Kramer HSD (honestly significant difference) test at a 5% significance level.

TABLE 21

Change in elasticity [g-force/g-force] with storage time of whole wheat pan bread without enzyme and with different enzyme treatments per kg flour.

| Enzyme | Day 1 | Day 4 | Day 7 |
|---|---|---|---|
| Control | 60.8a | 56.5a | 53.5a |
| 20 mg RSDA (SEQ ID: 1) + 20 mg Lipopan Xtra + 20 mg Lipopan 50 | 56.8b | 53.5b | 51.4b |
| 10 mg RSDA(SEQ ID: 3) + 20 mg Lipopan Xtra + 20 mg Lipopan 50 | 57.3b | 54.2b | 52.2b |

Values in the same column followed by different letters are statistically different using Tukey-Kramer HSD (honestly significant difference) test at a 5% significance level.

The invention claimed is:

1. A method of producing a baked product having reduced crumb elasticity, said method comprising
   a) adding a raw starch degrading alpha-amylase, a lipase and a phospholipase to dough ingredients comprising flour, water, and yeast and mixing to prepare a dough;
   b) leavening the dough, and
   c) baking the dough, wherein the raw starch degrading alpha-amylase has an amino acid sequence having at least 95% identity to SEQ ID NO:1 and wherein the baked product is free or essentially free of emulsifiers.

2. The method according to claim 1, wherein step a) further comprises adding an anti-staling amylase.

3. The method according to claim 2, wherein the anti-staling amylase is a maltogenic alpha-amylase having at least 95% identity to SEQ ID NO:2.

4. The method according to claim 1, wherein step a) further comprises adding one or more additional enzymes selected from the group consisting of a xylanase, a galactolipase, a protease, a transglutaminase, a cellulase, a hemicellulase, an acyltransferase, a protein disulfide isomerase, a pectinase, a pectate lyase, an oxidoreductase, a peroxidase, a laccase, a glucose oxidase, a pyranose oxidase, a hexose oxidase, a lipoxygenase, an L-amino acid oxidase or a carbohydrate oxidase, and/or a sulfurhydryl oxidase, a non-raw starch degrading alpha-amylase, and a glucoamylase.

5. A baked product produced by the method according to claim 1.

6. A dough prepared by adding a raw starch degrading alpha-amylase having at least 95% identity to SEQ ID NO:1, a lipase and a phospholipase to dough ingredients comprising flour, water, and yeast, and mixing.

7. A baking composition comprising a raw starch degrading alpha-amylase, a lipase and a phospholipase, wherein the raw starch degrading alpha-amylase has an amino acid sequence having at least 95% identity to SEQ ID NO:1.

8. The baking composition of claim 7, wherein the composition additionally comprises an anti-staling amylase.

9. The baking composition of claim 7, which is a dough, a flour composition, or a flour pre-mix.

10. The baking composition of claim 7, which is in the form of a granulate or agglomerated powder.

11. The baking composition of claim 10, wherein 95% (by weight) of the granulate or agglomerated powder has a particle size between 25 and 500 μm.

12. The method of claim 1, wherein the raw starch degrading alpha-amylase has an amino acid sequence having at least 97% identity to SEQ ID NO:1.

13. The method of claim 1, wherein the raw starch degrading alpha-amylase has an amino acid sequence of SEQ ID NO:1.

14. The method of claim 1, wherein the raw starch degrading alpha-amylase has an amino acid sequence of SEQ ID NO:3.

15. The baking composition of claim 7, wherein the raw starch degrading alpha-amylase has an amino acid sequence having at least 97% identity to SEQ ID NO:1.

16. The baking composition of claim 7, wherein the raw starch degrading alpha-amylase has an amino acid sequence of SEQ ID NO:1.

17. The baking composition of claim 7, wherein the raw starch degrading alpha-amylase has an amino acid sequence of SEQ ID NO:3.

* * * * *